US008200264B2

(12) United States Patent
Kim et al.

(10) Patent No.: US 8,200,264 B2
(45) Date of Patent: Jun. 12, 2012

(54) CYCLIC DELAY DIVERSITY BASED TRANSMISSION WITH DELAY HOPPING

(75) Inventors: Sang G. Kim, San Diego, CA (US); Li-Hsiang Sun, San Diego, CA (US); Shu Wang, San Diego, CA (US)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 12/434,091

(22) Filed: May 1, 2009

(65) Prior Publication Data

US 2009/0275352 A1   Nov. 5, 2009

Related U.S. Application Data

(60) Provisional application No. 61/050,595, filed on May 5, 2008.

(51) Int. Cl.
*H04B 7/00*   (2006.01)
(52) U.S. Cl. ......... 455/502; 455/522; 375/269; 375/299
(58) Field of Classification Search .................... 455/69, 455/101, 522, 502; 375/267, 299
See application file for complete search history.

(56) References Cited

U.S. PATENT DOCUMENTS

| 2005/0254592 A1 | 11/2005 | Naguib et al. | |
| 2006/0077886 A1 | 4/2006 | Oh et al. | |
| 2007/0147543 A1* | 6/2007 | Horng et al. | 375/299 |
| 2007/0274411 A1* | 11/2007 | Lee et al. | 375/267 |
| 2008/0039030 A1* | 2/2008 | Khan et al. | 455/101 |
| 2008/0144733 A1* | 6/2008 | ElGamal et al. | 375/267 |
| 2008/0247364 A1* | 10/2008 | Kim et al. | 370/336 |

FOREIGN PATENT DOCUMENTS

| JP | 2008514100 | 5/2008 |
| WO | 2007049768 | 5/2007 |
| WO | 2008047686 | 4/2008 |

OTHER PUBLICATIONS

K. Witrisal, et al., "Antenna Diversity for OFDM using Cyclic Delays;" Proceedings of the 8th Symposium on Communication and Vehicular Technology, Oct. 1, 2001, pp. 13-17.
Samsung, "Further Details on Adaptive Cyclic Delay Diversity Scheme", R1-051046, 3GPP TSG RAN WG1 Meeting #42bis, Oct. 2005.

* cited by examiner

*Primary Examiner* — Jean B Jeanglaude
(74) *Attorney, Agent, or Firm* — Lee, Hong, Degerman, Kang & Waimey

(57) ABSTRACT

A method of providing delay information in a multi-antenna transmission system is provided. A time delay value is selected from a set of time delay values. A mobile station is informed of information related to the selected time delay value. The same data is transmitted from a first antenna and from a second antenna. The data is transmitted from the second antenna after the data is transmitted from the first antenna according to the selected time delay value. The time delay value is selected based on a deterministic method or a random method.

5 Claims, 6 Drawing Sheets

CYCLIC DELAY DIVERSITY BASED TRANSMISSION WITH DELAY HOPPING

CROSS-REFERENCE TO RELATED APPLICATIONS

Pursuant to 35 U.S.C. §120, this application claims the benefit of U.S. Provisional Application Ser. No. 61/050,595 filed on May 5, 2008, the contents of which is hereby incorporated by reference herein in its entirety.

FIELD OF THE INVENTION

The present invention relates to a cyclic delay diversity (CDD) based transmission, and more particularly to a CDD-based transmission with delay hopping.

DESCRIPTION OF THE RELATED ART

Transmission and/or reception with multiple antennas have received much attention in academia and industry due to its potential enormous capacity increase. There are two modes of operation based on the availability of channel status information at the transmit side: open-loop operation and closed-loop operation. In open-loop operation, a base station does not receive channel status information from a mobile station. In closed-loop operation, a base station receives partial or full channel status information from a mobile station. Open-loop transmission incurs performance loss due to the lack of the channel status information, but provides for a simple operation. CDD has been considered in the context of open-loop transmission. With CDD, the same signal is transmitted from antenna elements with different delays. For example, when there are two antenna elements, the transmitted signal from the second antenna element is a delayed version of the transmitted signal from the first antenna element. One fixed delay value (or set of fixed delay values if more than two antenna elements are employed for the transmission) is utilized in open-loop operation. One fixed value may give a better reception quality for some users, but not much gain to the other users. This may be overcome by assigning a different optimum (or sub-optimum) delay value to each user (or group of users) through closed-loop operation in which each user is required to compute a delay value that provides the best metric (e.g., SINR) and to feedback the value to the central controller such as the base station in the cellular communications system. However, the closed-loop method will increase overhead transmission, thus leading to capacity reduction. In addition, due to the delay inherent in the feedback process, the delay value used in the central controller may be out-of-date.

SUMMARY OF THE INVENTION

In an exemplary embodiment of the present invention, a method of providing delay information in a multi-antenna transmission system is provided. A time delay value is selected from a set of time delay values. A mobile station is informed of information related to the selected time delay value. Data is transmitted from a first antenna and the data is transmitted from a second antenna. The data is transmitted from the second antenna after the data is transmitted from the first antenna according to the selected time delay value. The time delay value is selected based on a deterministic method or a random method.

In one embodiment, the time delay value is selected randomly from the set of time delay values.

In one embodiment, the time delay value is randomly selected based on a probability associated with each time delay value in the set of time delay values.

In one embodiment, in the random method, a probability for each time delay value in the set of time delay values changes.

In one embodiment, the time delay value is selected in an order of the set of time delay values.

In one embodiment, selecting the time delay value is based on non-cyclic-delay-diversity information from a receiver.

In one embodiment, the non-cyclic-delay-diversity information is channel quality information or acknowledgment information.

In one embodiment, a probability is assigned to each time delay value in the set of time delay values. The probability is decreased related to a particular time delay value and the probabilities are increased for other time delay values if negative acknowledgments are received for data transmitted with the particular time delay value and a number of negative acknowledgments are greater than a negative threshold. The probability is increased related to a particular time delay value and the probabilities decreased for other time delay values if positive acknowledgments are received for data transmitted with the particular time delay value and a number of positive acknowledgments are greater than a positive threshold.

In one embodiment, the sum of each probability in the set of time delay values equals 1.

In one embodiment, the information related to the selected time delay value is the time delay value.

In one embodiment, the information related to the selected time delay value is information informing the mobile station of no change in the time delay value or information informing the mobile station of a change in the time delay value.

In one embodiment, the time delay value is selected from a subset of the set of time delay values, the subset being smaller than the set of time delay values.

In one embodiment, a time interval is modified between selections of the time delay value.

In one embodiment, at least one additional time delay value is selected from the set of time delay values. The mobile station is informed of information related to the selected at least one additional time delay value. The data is transmitted from at least one additional antenna. The data is transmitted from each of the at least one additional antenna with a delay corresponding to each of the selected at least one additional time delay value.

In one embodiment, the multi-antenna transmission system is a cyclic delay diversity based transmission system with delay hopping.

In an exemplary embodiment of the present invention, a method of providing delay information in a multi-antenna transmission system is provided. The method includes periodically determining whether a first time delay value of a set of time delay values needs to be changed; selecting the first time delay value from the set of time delay values if the first time delay value is determined not to need to be changed; selecting a second time delay value from the set of time delay values if the first time delay value is determined to need to be changed; informing a set of mobile stations of information related to the selected time delay value; and transmitting data corresponding to each of the mobile stations in the set of mobile stations from a first antenna and from a second antenna, the data being transmitted from the second antenna after the data is transmitted from the first antenna according to the selected time delay value.

In one embodiment, the first time delay value is determined to need to be changed based on at least one of channel coherence or frequency selectivity.

In one embodiment, a base station determines which mobile stations served by the base station are included in the set of mobile stations and the base station makes the determination based on a velocity of each of the mobile stations served by the base station.

In one embodiment, selecting the second time delay value is based on a deterministic method or a random method.

In one embodiment, the second time delay value is always different from the first time delay value when selecting the second time delay value is based on the deterministic method.

In an exemplary embodiment of the present invention, a method of providing delay information in a multi-antenna transmission system is provided. The method includes selecting a time delay value from a set of time delay values for each base station of a plurality of base stations; informing a set of mobile stations corresponding to each base station of information related to the selected time delay value; and transmitting data from each base station to the corresponding set of mobile stations using a plurality of base-station antennas, the data being transmitted from each base station a plurality of times with a delay between transmissions through the plurality of antennas according to the selected time delay value. Selecting the time delay value is based on a deterministic method or a random method.

In one embodiment, the selected time delay value for a first base station of the plurality of base stations is different from the selected time delay value for a second base station of the plurality of base stations.

In one embodiment, the selected time delay value for a first base station of the plurality of base stations is the same as the selected time delay value for a second base station of the plurality of base stations.

In one embodiment, the selected time delay value for a first base station of the plurality of base stations is different from the selected time delay value for a second base station of the plurality of base stations.

DETAILED DESCRIPTION

For open-loop CDD-based transmission, fixed delay values may not provide performance gain for some users. To obtain performance gain, closed-loop CDD-based transmission may be used, but closed-loop CDD-based transmission increases overhead. In addition, limited or no performance gain may be obtained in closed-loop CDD-based transmission due to out-of-date delay values. According to exemplary embodiments of the present invention, methods for open-loop CDD-based transmission that overcomes the shortcomings present in the conventional CDD-based open-loop transmission are provided. The provided CDD-based transmission methods overcome the prior art shortcomings through delay hopping.

Figure 2:
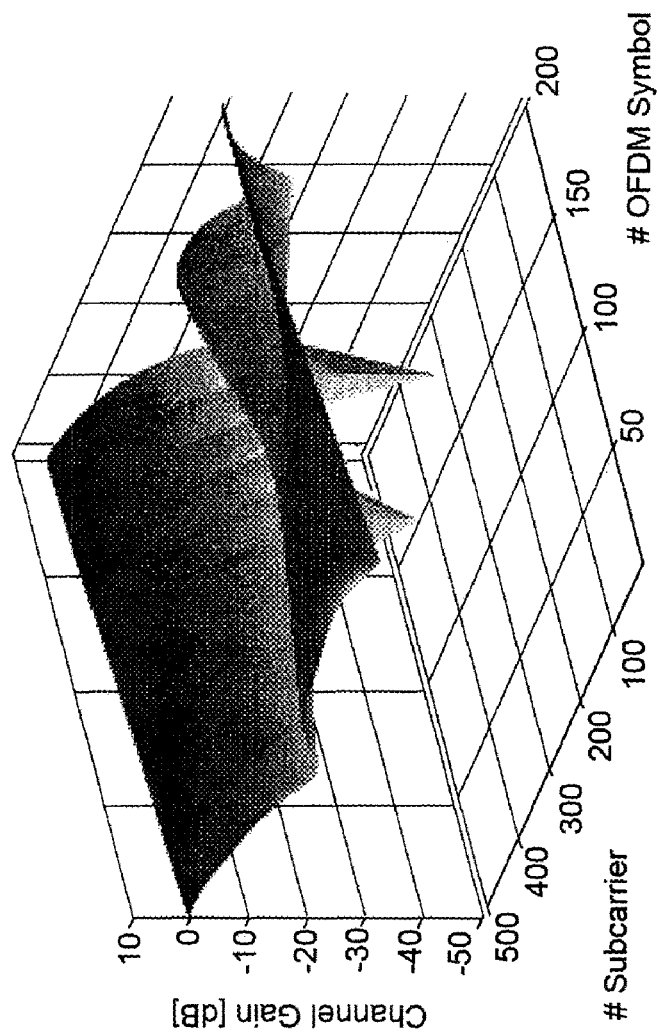
FIG. 2 is a plot showing channel gain with respect to a number of subcarriers and a number of orthogonal frequency divisional multiplexing symbols for the multi-antenna transmission of FIG. 1.
Figure 1:
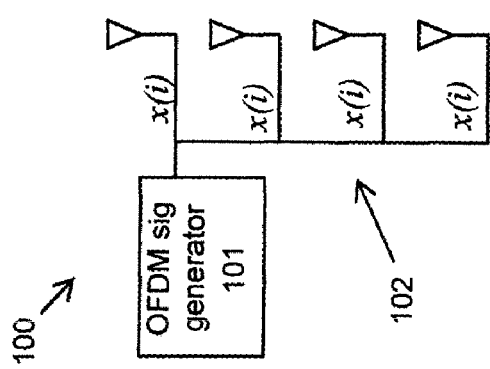
FIG. 1 is a diagram of a multi-antenna transmission system without time delay between each antenna transmission.

FIG. 1 is a diagram of a multi-antenna transmission system 100 without time delay between each antenna transmission. FIG. 2 is a plot showing channel gain with respect to a number of subcarriers and a number of orthogonal frequency-division multiplexing (OFDM) symbols for the multi-antenna transmission of FIG. 1. As depicted in FIG. 1, an OFDM signal generator 101 provides multiple versions of the same signal to a plurality of antenna elements 102 for transmission. The diversity scheme improves the reliability of the message signal by utilizing two or more communication channels with different characteristics.

Figure 4:
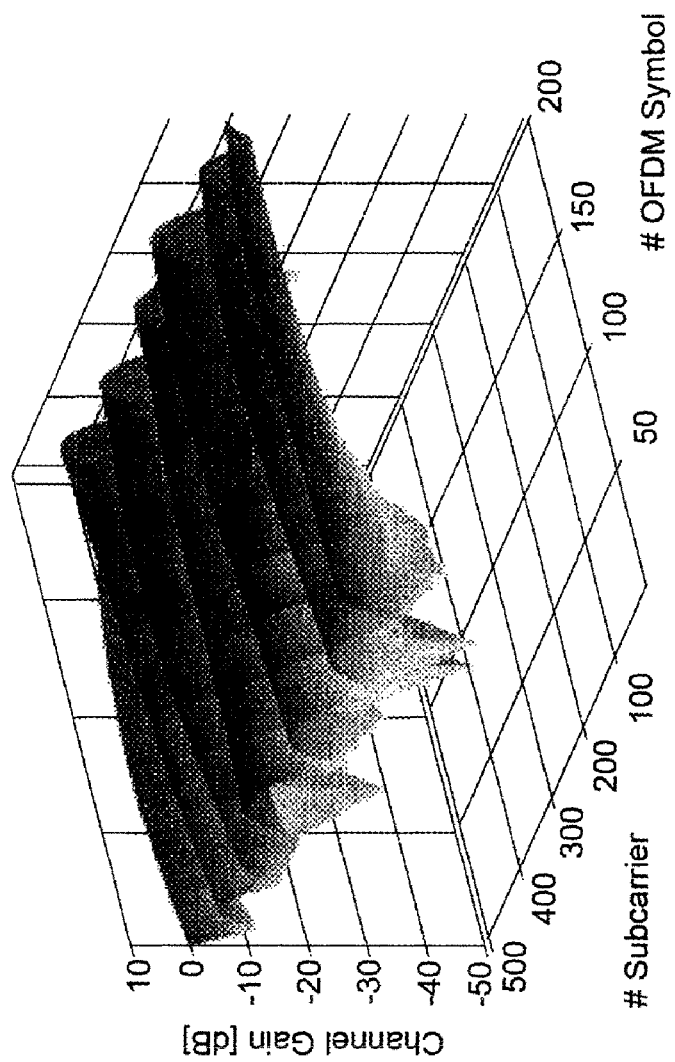
FIG. 4 is a plot showing channel gain with respect to a number of subcarriers and a number of orthogonal frequency divisional multiplexing symbols for the multi-antenna transmission of FIG. 3.
Figure 3:
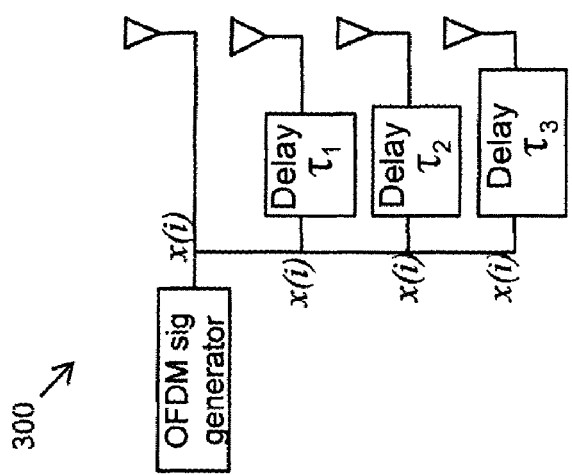
FIG. 3 is a diagram of a multi-antenna transmission system with a time delay between each antenna transmission for implementing CDD.

FIG. 3 is a diagram of a multi-antenna transmission system 300 with a time delay between each antenna transmission for implementing CDD. FIG. 4 is a plot showing channel gain with respect to a number of subcarriers and a number of orthogonal frequency divisional multiplexing symbols for the multi-antenna transmission of FIG. 3. CDD transforms a multiple-input-multiple-output channel into a single-input-multiple-output channel, introduces artificial multi-paths (i.e., time delayed replicated signals from multiple antennas), and increases frequency selectivity. FIG. 4 shows improved channel gain as compared to FIG. 2 for OFDM-based telecommunication systems that utilize CDD.

Figure 5:
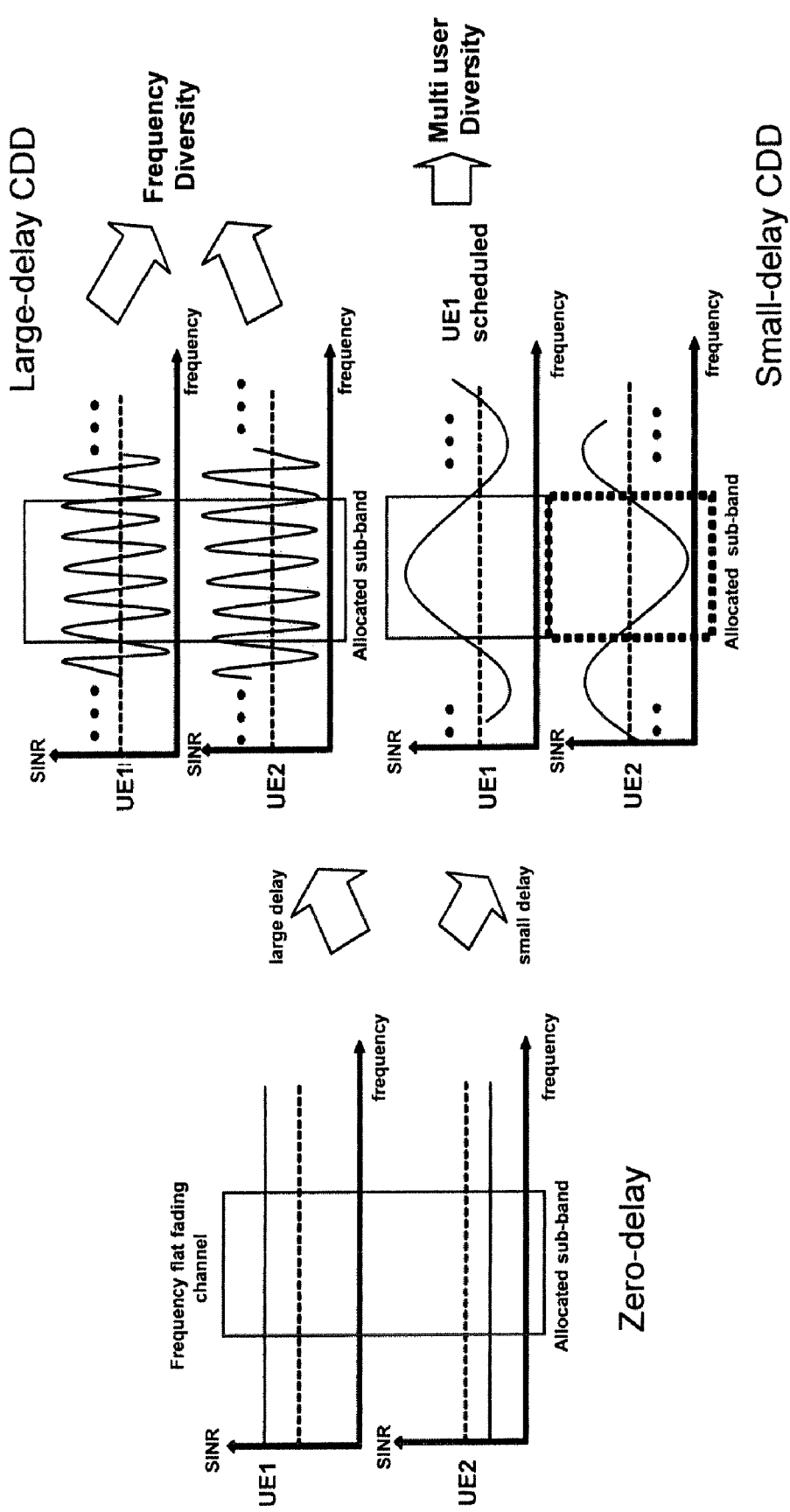
FIG. 5 is an illustration showing the effect of the size of the CDD delay.

FIG. 5 is an illustration showing the effect of the size of the CDD delay. With zero-delay, for some users (UE1) the signal to interference plus noise ratio (SINR) is above a necessary threshold for all frequencies, while for other users (UE2) the SINR is below the threshold for all frequencies. With small delay CDD, user UE1 can be allocated a sub-band in which the SINR is above the threshold. For user UE2, the same sub-band has a SINR below the threshold, and therefore a different sub-band would be allocated to UE2. Small-delay CDD provides multi-user diversity in the frequency domain—i.e., if there is one user, then the one user can only utilize half of the frequency spectrum, but if there are multiple users, the multiple users can utilize the entire frequency spectrum. CDD transforms a frequency-flat channel to a frequency-selective channel. For example, if there are two users, in a frequency-flat channel, when the channel for UE1 is favorable as compared to UE2, then the base station chooses UE1 for transmission and UE2 is not served. In the frequency-selective channel, some portion of the frequency band, called a sub-band, is good for UE1, and some other frequency band is good for UE2. Each user can be served over the sub-bands showing favorable conditions. With large delay CDD, both user UE1 and user UE2 can be allocated the same frequency sub-band, with UE1 and UE2 allocated narrower sub-bands with SINR above the threshold within the allocated frequency sub-band. Large delay CDD provides frequency diversity, which allows for utilization of particular frequencies more finely than small delay CDD. For delay value in large CDD transmission, up to ⅔ of OFDM symbol time is defined in 3GPP long-term evolution (LTE).

In CDD-based transmission, the frequency diversity gain is provided to the mobile station by inducing frequency-selectivity to the channel response seen by the mobile station. As described in relation to FIG. 3, frequency-selectivity is introduced by applying the same signal throughout the antenna elements and delaying the transmission times from antenna elements. For example, when the base station has two transmit antennas, the transmission from the second antenna is delayed for a fixed duration of time. The requirement on degree of frequency-selectivity (or frequency diversity gain) to achieve a certain gain may be different for each user due to the channel conditions each mobile station experiences. A mobile station in a suburban macro-cell may require a larger delay value than a mobile station in an urban micro-cell. Even in a suburban macro-cell, the delay value required to achieve a certain performance may vary from mobile station to mobile station. A mobile station with shorter delay spread may require a larger delay value than a mobile station with a longer delay spread. Furthermore, a selected delay value at one time instance may not provide certain required performance at another time instance. The inconsistent performance of a selected delay value is due to time variation of channel known as Doppler spread.

As described above, each mobile station may require a different delay value, as one fixed delay value is not suitable for all mobile stations in the system. Even if a different delay value is assigned to each mobile station, the assigned delay values will not always be optimum for the channel. Accordingly, there is a need for a method to change the assigned delay value for a mobile station over time. The assigned delay value can be changed through CDD feedback from the mobile station (closed-loop) or autonomously by the base station (open-loop). Exemplary embodiments of the present invention are directed toward an open-loop method of changing the assigned delay value for a set of mobile stations autonomously by the base station, the set of mobile stations being a mobile station, a subset of mobile stations, or the entire set of mobile stations served by a base station. In an exemplary embodiment of the present invention, the assigned delay value is selected from a set of predefined delay values provided to the base station.

Figure 6:
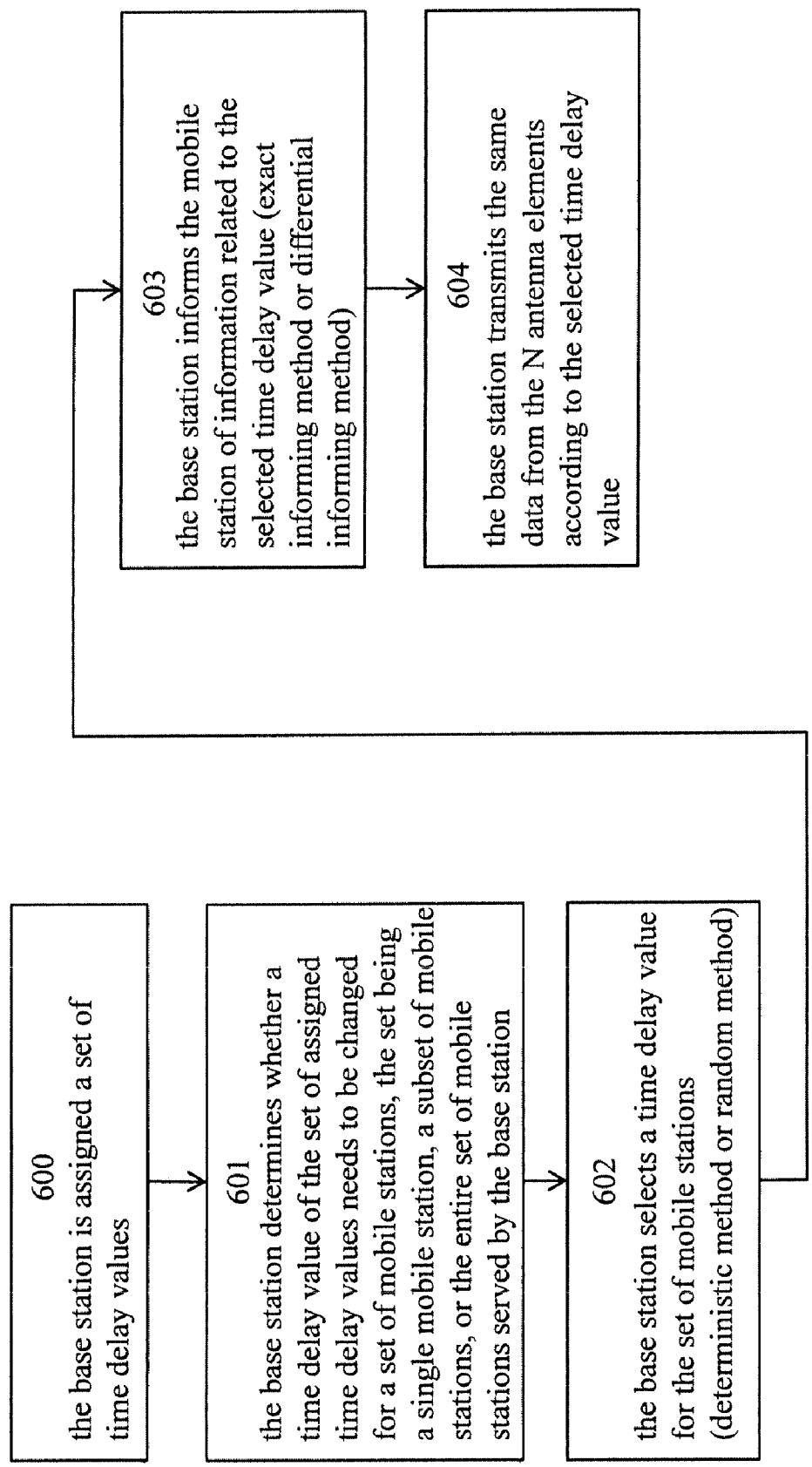
FIG. 6 is a flow chart of a method of providing delay information in a multi-antenna transmission system according to an exemplary embodiment of the present invention.

FIG. 6 is a flow chart of a method of providing delay information in a multi-antenna transmission system according to an exemplary embodiment of the present invention. In an exemplary embodiment of the present invention, each base station (or sector) is provided or assigned a set of delay values (600). The set may be disjoint from or overlap (partially or fully) sets provided to other base stations. For example, a first base station may be assigned a set of delay values T1, T3, T5, and T6 and a second base station may be assigned a set of delay values T2, T3, T4, and T7. In this case, the set assigned to the second base station partially overlaps the subset assigned to the first base station.

The base station periodically determines whether a time delay value for a set of mobile stations needs to be changed (601). The set of mobile stations may be one mobile station, a subset of mobile stations, or the entire set of mobile stations served by the base station. The base station may make the determination to change the time delay value based on channel coherence and/or frequency selectivity. If the time delay value needs to be changed, the base station selects a time delay value for the set of mobile stations (602). If the set of mobile stations is a subset of the mobile stations served by the base station, the base station determines whether a time delay value needs to be changed and assigns a new time delay value for each of the other subsets of mobile stations that make up the entire set of mobile stations serviced by the base station.

The base station selects the time delay value based on a deterministic method (e.g., predetermined method) or a random method. For deterministic selection, the time delay value may be selected in an order of the assigned time delay values. Alternatively, for deterministic selection, the time delay value may be selected based on a cyclic shift of the elements in the assigned set. For random selection, the base station randomly chooses a time delay value from the assigned time delay values subject to a probability assigned to each of the time delay values in the assigned time delay values. The probability distribution of the time delay values in the assigned time delay values may be equally distributed or may be updated based on gathered statistics or on non-cyclic-delay-diversity information from a receiver, such as feedback from the mobile station.

Next, the base station informs the set of mobile stations of information related to the selected time delay value (603). The base station may employ an exact informing method or a differential informing method. In the exact informing method, the base station informs the set of mobile stations of the exact time delay value utilized by the base station. In the differential informing method, the base station provides a set of time delay values to the set of mobile stations from the set of time delay values assigned to the base station and the base station informs the set of mobile stations that the current time delay value will be maintained or that a different time delay value will be utilized. If a mobile station is informed that a different time delay value will be utilized, the mobile station determines which time delay value of the provided set of time delay values was selected by the base station. The exact informing method can be combined with the differential method. The exact time delay value can be informed at a predetermined time interval and the differential informing can be utilized between two subsequent exact informings. The exact informing method uses more bits, as the differential informing method requires just one bit.

The exact informing method may be periodic or aperiodic. In an exact informing periodic mode, the base station periodically informs the set of mobile stations of the exact time delay value even if there is no change in the time delay value. Periodicity of being informed (i.e., the time interval between two consecutive informing messages) is adjustable depending on the channel condition the mobile station experiences. For example, if the mobile station is stationary, the periodicity may be large, and if the mobile station is moving, the periodicity may be small. In an exact informing aperiodic mode, the base station informs the set of mobile stations of the exact time delay value only when there is a change in the time delay value. The differential informing method is periodic, as every defined interval the set of mobile stations is informed whether to maintain or to change the current time delay value. After the set of mobile stations is informed of the information related to the time delay value, for each of the mobile stations in the set of mobile stations, the base station transmits the corresponding same data from its N antenna elements according to the selected time delay value (604). In an exemplary embodiment, the time delay values for N antenna elements are $0, T, 2T, 3T, \ldots, (N-1)T$, where T is the time delay value utilized by the base station. As such, the time delay value between each successive transmission from an antenna element is equal to T.

Figure 7:
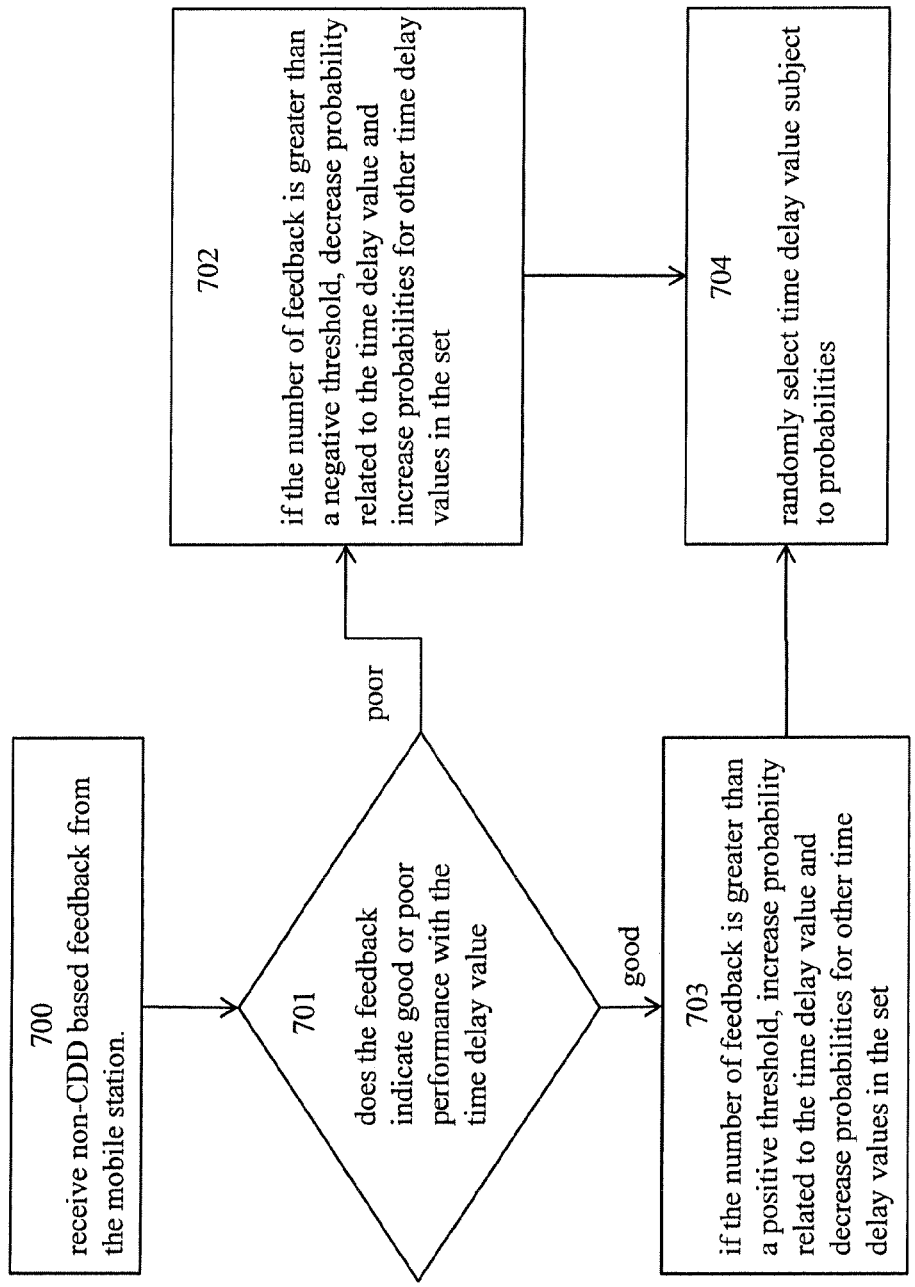
FIG. 7 is a flow chart of a method of updating probabilities for a set of time delay values according to an exemplary embodiment of the present invention.

FIG. 7 is a flow chart of a method of updating probabilities for a set of time delay values according to an exemplary embodiment of the present invention. FIG. 7 applies if the selection method in 602 is based on a random method and the base station receives non-CDD based feedback with which probabilities may be assigned. As indicated in FIG. 7, the base station receives non-CDD based feedback from the mobile station (700). The non-CDD based feedback may be acknowledgment feedback or channel quality feedback from the mobile station. The acknowledgment and channel quality feedback are part of normal operations of data transmission and existing information is reused for CDD-based transmission purposes, therefore open-loop operation is maintained.

Using the non-CDD based feedback, the base station assigns a probability to each time delay value. The base station decreases the probability related to a particular time delay value and increases the probabilities for other time delay values in the set if a number of negative feedback in a predetermined time interval are received greater than a negative threshold for data transmitted with the particular time delay value (701/702). The base station increases the probability related to a particular time delay value and decreases the probabilities for other time delay values in the set if a number of positive feedback in a predetermined time interval are received greater than a positive threshold for data transmitted with the particular time delay value (701/703). The probabilities are adjusted such that the sum of the probabilities equals 1 (i.e., 100%). The base station randomly selects a time delay value subject to the probabilities (704). As mentioned above, the selection may be periodic or aperiodic. The selection may be aperiodic or periodic if exact informing is employed. The selection is periodic if differential informing is employed.

An example best demonstrates the method. Assume the base station has been assigned the set of time delay values T2, T3, T5, and T6, the base station is employing a random method of selection, and the base station periodically determines whether the time delay value for the particular mobile station needs to be changed. If the base station determines that the time delay value needs to be changed, the base station selects a time delay value from the set of assigned time delay values T2, T3, T5, and T6. The base station may initially assign a probability of 25% to each of these delay values. Assume that the base station initially selects T3 (704). The base station then uses the time delay T3 when sending the data. If the base station receives sufficient feedback (i.e., a number of feedback, such as negative acknowledgment for data transmission, greater than a negative threshold) from the set of mobile stations (700) that provides evidence that the performance of the mobile station is poor when the time delay value T3 is used (701), the base station may lower the probability of T3 to 19% and increase the probabilities for T1, T5, and T6 to 27% (702). Next, assume that the base station then subsequently randomly selects T1 subject to the probabilities (704). The base station then uses the time delay T1 when sending data. If the base station receives sufficient feedback (i.e., a number of feedback, such as positive acknowledgment for data transmission, greater than a positive threshold) from the set of mobile stations that provides evidence that the performance of the mobile station is good when the time delay value T1 is used (701), the base station may raise the probability of T1 to 33% and lower the probability of T3 to 17%, of T5 to 25%, and of T6 to 25% (703).

As described above in relation to FIG. 6, in an exemplary embodiment, the same data is sent from N antennas with a respective time delay of 0, T, 2T, ..., (N−1)T, where T is the selected time delay value. In the exemplary embodiment, the set of mobile stations is informed through an exact informing method and/or a differential informing method (603). In both the differential informing method and the exact informing method, the set of mobile stations is initially provided a set of time delay values from which the base station selects. In the differential informing method, the set of mobile stations must then determine which time delay value was selected from the provided set of time delay values.

However, in an alternative embodiment, the time delay between each subsequent transmission is not a multiple of a single time delay value. In this alternative embodiment, in both the exact informing method and the differential informing method, the set of mobile stations is provided sets of time delay values rather than one time delay value. For example, if N=3 and the base station has been assigned time delay values of T1, T3, T5, and T6, the base station may provide the mobile station with the sets of time delay values {{T1,T3}, {T1,T5}, {T5,T6}}. In the exact informing method, the base station informs the set of mobile stations whether the base station will utilize the first, second, or third set of time delay values. In the differential informing method, the base station informs the set of mobile stations whether it will maintain or change the set of time delay values, and the set of mobile stations must then determine whether the base station is utilizing the first, second, or third set of time delay values. In this alternative embodiment, the base station assigns probabilities to each set of time delay values in the provided sets of time delay values. As such, the base station will assign separate probabilities to {T1,T3}, {T1,T5}, and {T5,T6}.

The rate at which time delay values are randomly selected depends on the mobility of each set of mobile stations. The base station may select a new time delay value when the base station determines that a particular set of mobile stations needs a new time delay value. As mentioned above, the feedback from the mobile station may not necessarily be related to CDD-based transmission, but rather to a normal mode of operation (i.e., non-CDD-based transmission). In orthogonal frequency-division multiple access (OFDMA), one OFDM symbol may carry information for multiple users. The base station may choose a delay value based on the probability distribution computed from the feedback provided by the particular set of mobile stations such as acknowledgment and channel quality feedback.

When a different subset (partially overlapped or disjoint) of delay values is assigned to each base station or sector, a mobile station in the cell-edge may see a richer frequency-selective composite channel from the transmission from multiple base stations or sectors. This, in turn, will provide more frequency diversity gain to the mobile station in the cell-edge region, thus enhancing overall system throughput. Each base station or sector may use different starting delay values in cyclic shifting from the set of delay values. In this case, all base stations use the same set of delay values, but different starting points for cyclic shifting. In addition, each base station or sector may choose time delay values independently from statistics collected within the sector.

Figure 8:
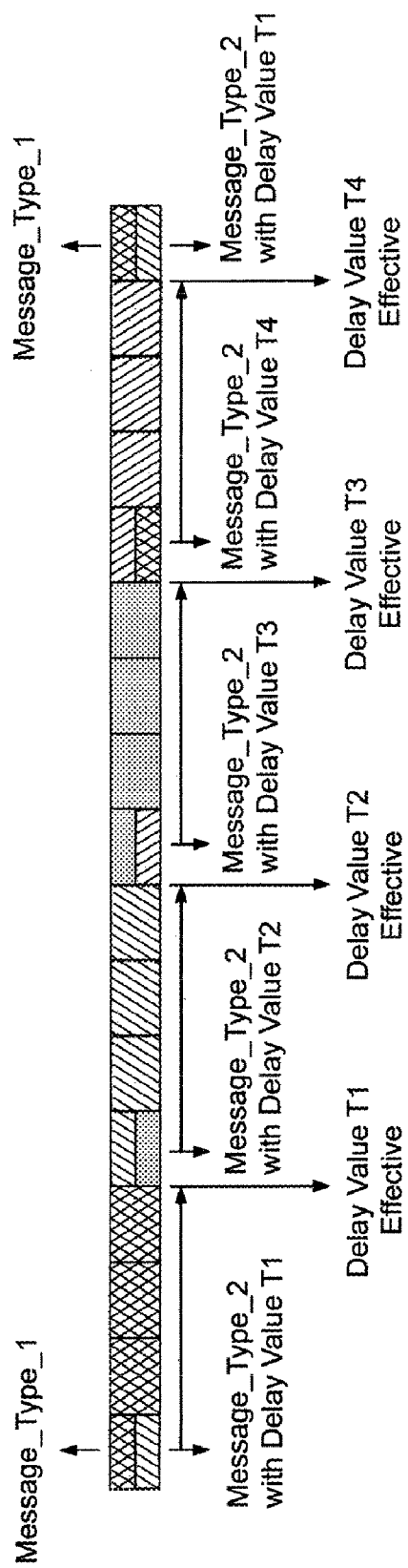
FIG. 8 is an illustration depicting a method of providing delay information in a multi-antenna transmission system according to an exemplary embodiment of the present invention.

FIG. 8 is an illustration depicting a method of providing delay information in a multi-antenna transmission system according to an exemplary embodiment of the present invention. Specifically, FIG. 8 illustrates an example timing relationship of Message_Type_1 and Message_Type_2. In FIG. 8, there are 4 time delay values T1, T2, T3, and T4 and each time delay value is maintained for four physical frame durations and the set of mobile stations is informed of the next delay value three physical frames ahead of time. As depicted in FIG. 8, there are two types of messages: Message_Type_1 and Message_Type_2.

Message_Type_1 provides the time delay values or a predefined subset of the available time delay values to the set of mobile stations. Message_Type_1 may be transmitted as a system-wide or a sector-wide broadcast message and may be transmitted infrequently. Message_Type_1 may coincide with a start of a repetitive predetermined delay hopping sequence. For example, if the predefined subset of the available time delay values contains four time delay values T1, T2, T3, and T4, and there are four physical frames of duration for each selected time delay value, then Message_Type_1 may be transmitted once for every 16 physical frames.

Message_Type_2 provides a particular time delay value to a set of mobile stations in an exact informing mode or requests the set of mobile stations to change its time delay value in a differential informing mode. The exact informing mode requires more bits to convey the information, but will help with channel estimation in the set of mobile stations. In the exact informing mode, Message_Type_2 provides the selected time delay value. In the differential informing mode, Message_Type_2 either requests the set of mobile stations to maintain its time delay value or requests the set of mobile stations to change its time delay value. When requested to change their time delay value, each mobile station in the set of mobile stations changes its time delay value to another time delay value in the predefined subset of the available delay values provided by the base station in Message_Type_1. Message_Type_2 may also provide information to the set of mobile stations on the duration of applying the particular time delay value or on the time interval between the transmissions of subsequent Message_Type_2 messages. In the differential informing mode, this information alternatively may be included in Message_Type_1.

In the differential informing mode, when the base station requests a set of mobile stations to change its time delay value, each mobile station in the set of mobile stations must determine the time delay value that was selected by the base station. The base station may select time delay values from an available subset either randomly, subject to assigned probabilities, or in a deterministic manner. In the differential mode, each mobile station in the set of mobile stations must determine which of the time delay values was selected and apply the particular time delay value. For example, if the base station assigns four time delay values, T1, T2, T3, and T4 to the set of mobile stations through Message_Type_1, and the base station randomly selects time delay value T3 while the set of mobile stations is currently utilizing time delay value T2, each mobile station in the set of mobile stations must determine whether the base station selected T1, T3, or T4, and then apply the time delay value determined to have been selected by the base station in order to properly anticipate the reception of the data from the base station.

In the description above in relation to FIG. 8 applies when one time delay value is utilized for N antenna elements, with the delay between each successive transmission from each antenna element equal to the one time delay value. If multiple time delay values are utilized (see discussion of an alternative exemplary embodiment above), then in the exact informing mode, Message_Type_1 will contain sets of time delay values, and Message_Type_2 will contain a number that informs the set of mobile stations which set of the sets of time delay values will be utilized for transmission by the base station. If multiple time delay values are utilized, then in the differential informing mode, Message_Type_1 will contain the same information as Message_Type_1 in the exact informing mode.

As described above, the base station selects a time delay value for each set of mobile stations served by the base station. For example, assume that there are 100 mobile stations served by a particular base station. A first set of mobile stations might contain 20 of the 100 mobile stations, a second set of mobile stations might contain 30 of the remaining 80 mobile stations, and a third set of mobile stations might contain the remaining 50 mobile stations. The base station selects a first time delay value for the first set of mobile stations, a second time delay value for the second set of mobile stations, and third time delay value for the third set of mobile stations. As such, the base station selects time delay values and informs each set of mobile stations served by the base station its respective time delay value.

The base station may change which mobile stations are in each set of mobile stations. That is, in the above example, the base station might change which mobile stations are in each of the first, second, and third sets depending on certain characteristics, one of which includes the speed/velocity of the mobile terminal. As the mobile terminal moves with increasing velocity (e.g., the user is driving), the mobile terminal experiences increasing frequency selectivity, and therefore the base station may select small time delay values to provide a small gain. However, if the mobile terminal is stationary, then the mobile terminal is frequency flat, and the base station may select larger time delay values to provide a larger gain. Accordingly, the base station may group mobile stations served by the base station into particular sets depending on the velocity of the mobile station. The base station may then assign a time delay value to each of the sets of mobile stations.

A method to implement improved CDD-based transmission that reflects real channel conditions without relying on explicit feedback from mobile stations is provided. The method is based on open-loop CDD-based transmission. In order to implement the method, two types of messages are proposed. The number of messages is of no importance, but the fields that implement desired features are important. Using the provided method enhances CDD-based transmission even for mobile stations with high mobility or in the cell-edge region. Accordingly, the provided method provides enhanced system throughput.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method for transmitting signals at an eNodeB using a plurality of antennas in a wireless communication system, the method comprising:

selecting a time delay value from a set of time delay values based on non-cyclic-delay-diversity information from a receiver, wherein the non-cyclic-delay-diversity information is acknowledgment information comprising positive acknowledgments and negative acknowledgments;

transmitting data from a first antenna and a second antenna of the plurality of antennas, the data transmitted from the second antenna after the data is transmitted from the first antenna according to the selected time delay value;

assigning a probability to each time delay value in the set of time delay values;

decreasing the probability related to a specific time delay value of the time delay values and increasing the probabilities related to other time delay values of the time delay values if negative acknowledgments are received for data transmitted with the specific time delay value and a number of the negative acknowledgments is greater than a negative-acknowledgment threshold; and increasing the probability related to a specific time delay value of the time delay values and decreasing the probabilities related to other time delay values of the time delay values if positive acknowledgments are received for data transmitted with the specific time delay value and a number of the positive acknowledgments is greater than a positive-acknowledgment threshold.

2. The method of claim 1, further comprising informing a mobile station of information related to the selected time delay value.

3. The method of claim 1, further comprising modifying a time interval between selections of the time delay value.

4. A method for transmitting signals at an eNodeB using a plurality of antennas in a wireless communication system, the method comprising:
   generating a set of symbols; and
   transmitting the set of symbols through the plurality of antennas;
   wherein the set of symbols includes first type symbols, second type symbols and third type symbols,
   wherein the second type symbols are cyclic time-delayed with a predetermined value with respect to the first type symbols, and
   wherein the third type symbols are cyclic time-delayed with the predetermined value with respect to the second type symbols.

5. The method of claim 4, wherein the set of symbols are orthogonal frequency division multiplexing (OFDM) symbols.

* * * * *